United States Patent [19]

Heckenbach

[11] Patent Number: 4,504,959
[45] Date of Patent: Mar. 12, 1985

[54] NOISE-NEUTRALIZING DIGITAL INTERFACE CIRCUIT

[75] Inventor: Terry A. Heckenbach, Middlebury, Ind.

[73] Assignee: Johnson Service Company, Milwaukee, Wis.

[21] Appl. No.: 469,930

[22] Filed: Feb. 25, 1983

[51] Int. Cl.³ .............................................. H04L 5/14
[52] U.S. Cl. ...................................... 375/36; 375/58; 375/99; 307/360; 307/475
[58] Field of Search ................... 375/7, 36, 58, 76, 99; 307/358, 360, 475; 179/2 DP, 2 C

[56] References Cited

U.S. PATENT DOCUMENTS

| 3,638,183 | 1/1972 | Progler et al. | 375/76 |
| 4,017,747 | 4/1977 | Sheng | 307/360 |
| 4,341,927 | 7/1982 | Shinoi et al. | 179/2 DP |
| 4,358,689 | 11/1982 | Jarrett et al. | 307/360 |
| 4,443,884 | 4/1984 | Swarz | 370/85 |
| 4,445,222 | 4/1984 | Smitt | 370/85 |

Primary Examiner—Jin F. Ng
Attorney, Agent, or Firm—Larry L. Shupe; Joseph J. Jochman, Jr.; John P. Ryan

[57] ABSTRACT

The invention facilitates the reception of bus-transmitted digital signals in the presence of electrical noise and includes a transmitter adapted to be coupled to a two wire communication bus. The transmitter has a controllable transistor for switching one wire of the bus between zero and reference voltages, thereby generating digital output signals. A receiver is coupled to the bus for receiving digital input signals which define a first wave form and are transitory between a first voltage and a second voltage. The receiver includes an R-C circuit for shaping the first wave form to a second wave form and a hysteresis switch for providing a first output condition when the second wave form transcends through a first intermediate voltage in a first transition direction. A second output condition is provided when the second wave form transcends through a second intermediate voltage in a second transition direction.

6 Claims, 7 Drawing Figures

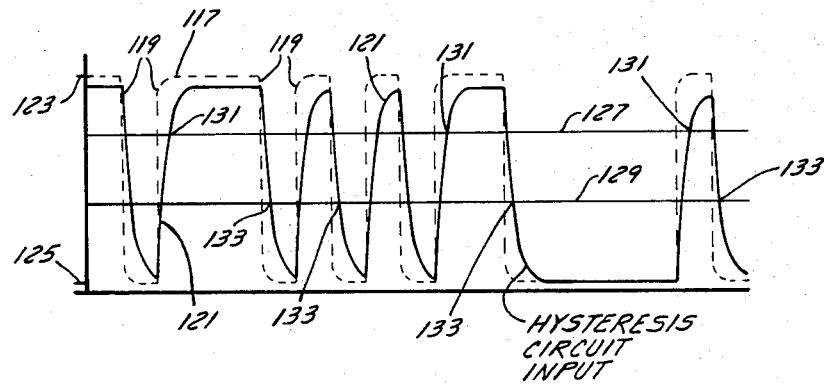
FIG. 5
$$V_{IN} = V_{OUT}\left(\frac{Rm}{Rn+Rm}\right) + V_{NODE}\left(\frac{Rn}{Rn+Rm}\right)$$
FIG. 7
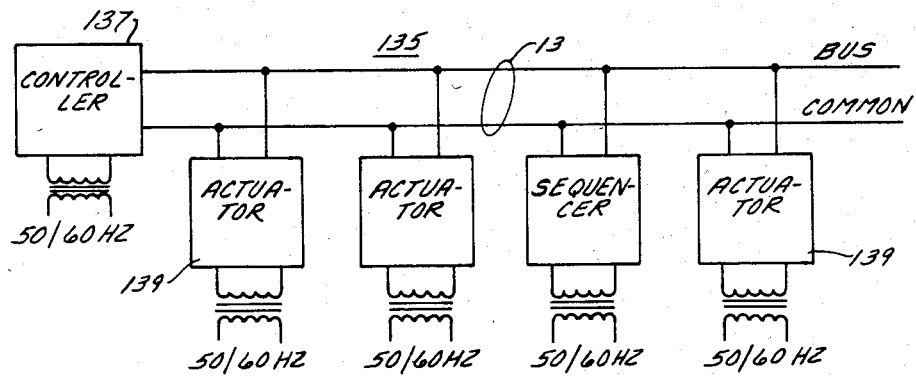
FIG. 6

NOISE-NEUTRALIZING DIGITAL INTERFACE CIRCUIT

BACKGROUND OF THE INVENTION

This invention relates generally to bus-effected digital communications systems and more specifically to a digital interface circuit for neutralizing spurious electrical noise and to facilitate digital communications between a system controller coupled by a communication bus to remotely located, controlled apparatus. The interface circuit is particularly useful in certain types of heating, ventilating and air conditioning (HVAC) process control systems.

Bus-linked process control systems typically include a system controller coupled to one or more sensors for receiving signals therefrom relative to the valves of process parameters. Such a controller will process the received signals and depending upon the values thereof, generate command signals for maintaining or modifying the parameters. Such command signals are directed to remotely-located equipment operative to control such parameters. Additionally, it is frequently desirable for the remote control equipment itself to generate signals to be directed to the system controller along the linking bus. With the advent of microprocessor-based low voltage digital communications networks which form a part of such process control systems, it has been found that spurious electrical noise which may appear on the linking bus will, unless addressed by the system designer, result in the transmission of false digital signals between the controller and the remote equipment.

Spurious electrical noise may comprise one or more types as, for example, a persistent spurious noise which has a maximum half-wave amplitude substantially less than the maximum amplitude of the digital signal. Another type of unwanted noise may result from any precipitous, spurious depression of the switched bus voltage for a duration insufficient to represent a valid change in logic state and yet which reaches a value otherwise indicative of such a change. Yet another type of unwanted electrical noise may include random transient voltage spikes having a maximum amplitude greater than that of the digital signal and yet have a duration substantially less than one bit time. Further, these transient voltage spikes may exhibit a polarity corresponding to or opposite from the polarity of the digital signal.

One approach to the neutralization of certain types of spurious noise is to utilize a two-wire, ungrounded bus and generating digital signals thereon by voltages of substantially equal magnitude and of alternating, opposite polarity one from the other as, for example, by switching between +12 V. and −12 V. Authentic digital signals generated by switching between two such voltages are readily distinguishable from low amplitude noise which may appear in the region of 0 V. Bus arrangements of this type attempt to eliminate interference from transient spikes having relatively high magnitudes by using bus shielding and/or other special wiring techniques. Yet another approach to the neutralization of unwanted noise is to utilize a two-wire grounded bus and generate digital signals by switching the bus between a first voltage, either positive or negative, and 0 V. A logic midpoint is selected to be nominally equal to one half of the first voltage and if the value of the digital voltage lies above this midpoint, it is presumed to be at logic "1" and if below, at logic "0". With this approach, a low-amplitude spurious signal which may occur about the midpoint or which may be superimposed upon the digital signal itself may likewise cause false signals unless steps such as extensive noise filtering or the provision of elaborate message checking sequences are used. Additionally, these approaches fail to appreciate the manner in which the interfacing circuit may incorporate means for resetting the circuit and may be protected from the inadvertent application of unwanted, steady state voltages which may result from, for example, an incorrect wiring connection.

A noise-neutralizing digital interface circuit to facilitate bidirectional communications and which is capable of distinguishing between authentic digital signals and unwanted, low level spurious noise, which is capable of neutralizing a high amplitude noise of brief duration, which is capable of attenuating a brief, precipitous voltage depression on the switched bus, which includes means for protecting the circuit from the damaging effects of undesired transient or steady state voltages and which may optionally include a reset function when the interface circuit is used on remotely-located, controlled devices would be a significant advance over the prior art.

SUMMARY OF THE INVENTION

In general, the first embodiment of the digital interface circuit of the present invention includes transmitter means adapted to be coupled to a communication bus and having a controllable switch for generating digital output signals to be transmitted to the bus. A receiving means is coupled to the transmitter means for receiving digital input signals transitory between a first voltage and a second voltage. The receiving means provides a first output condition when the input signal transcends through a first intermediate voltage in a first direction and provides a second output condition when the input signal transcends through a second intermediate voltage in a second direction. In a second embodiment, the digital interface circuit additionally includes reset means coupled to the receiving means and responsive to a command signal for resetting the receiving means to a predetermined one of the output conditions.

More particularly, the inventive digital interface circuit is adapted for use with a two-wire communication bus, each wire of which is attached to a bus terminal for facilitating external connections. A typical digital signal transmitted from or received at the interface circuit bus terminals would have a first wave form substantially defining rectangular or square envelopes. That is, a signal representing a digital bit would define a trace having transition phases substantially parallel to one another. One wire of the bus may be grounded and the second controllably switched between a low voltage as, for example, plus or minus 5 V. and ground for providing the required digital signals. After reviewing the specification and the drawing, it will be apparent to one of ordinary skill in the art that the inventive interface circuit may be readily adapted for use with a negative bus voltage.

The circuit includes a transmitter section adapted to be coupled to a communication bus and has a controllable switch such as a transistor for selectively switching the ungrounded bus or switched bus, as the case may be, between a bus reference voltage and ground, thereby generating digital output signals. In order to protect the switching transistor from the inadvertent application of a voltage having a polarity opposite to that at which the transistor has its higher voltage rating, it is preferable to include a bypass element such as a diode in parallel therewith. A current limiting element such as a resistor or fuse is coupled in series with the diode for limiting the magnitude of the resulting current.

The receiving section is coupled to a bus and includes first conditioning means, preferably a resistance-capacitance filter having a time constant, for shaping the first wave form of the incoming digital signal to a second wave form resembling a sawtooth profile. The resulting second wave form is directed to a hysteresis switch, the output of which is coupled to other processing and computing circuitry as, for example, to a microprocessor.

While a preferred hysteresis switch useful in the interface circuit of the first embodiment is embodied as a type 555 timer chip, a description of the internal construction of that chip will be helpful in understanding the invention. The hysteresis switch includes a voltage divider and comparator network coupled to a flipflop with an inverted output, the voltage divider including a plurality of resistors serially arranged between the bus reference voltage and ground. The resistors are selected to have values equivalent one to the other for providing a first node at a first intermediate voltage having a value which is two thirds of the bus reference voltage. A second node is at a second intermediate voltage having a value which is one third the bus reference voltage. When arranged in that manner, the ratio of the first intermediate voltage to the second intermediate voltage is 2:1 and the ratio of the reference voltage to the second intermediate voltage is 3:1. It is to be appreciated, however, that when the hysteresis switch is embodied using discrete components, a wide variety of ratiometric relationships may be selected, depending principally upon the anticipated maximum amplitude of low level noise which is to be neutralized. These intermediate voltage nodes are each connected to an input pin of one of a pair of voltage comparators, the other input pins of which are coupled to the bus in a manner described in detail below. The output pins of the comparators are connected to the input pins of a flipflop circuit. As the voltage of the second wave form transcends through the first intermediate voltage in a first increasing direction, the first comparator having the first intermediate voltage coupled at an input thereof will change state to provide a first output condition equal to a logic "". As the second wave form transcends through the second intermediate voltage in a second, decreasing direction, the second comparator will switch to a second output condition equal to a logic "1".

In a preferred embodiment, the receiving section also includes a clamping network for neutralizing transient electrical noise which has a polarity opposite to that of the digital signals and the reference voltage or which has a polarity corresponding thereto but in excess of the bus reference voltage. When the digital interface circuit of the present invention is used in connection with remotely-located equipment to be controlled by a system process controller, it is desirable to provide means by which a command signal from the controller may be used for resetting the circuitry of the remote equipment to a known logic state. Such command signals are usually employed whereby remote equipment may be automatically reset shortly after the application of power to the system or in the event the remote equipment exhibits undesirable characteristics. Accordingly, in a second preferred embodiment of the invention, the circuit includes a reset section coupled to the receiving section and arranged to be responsive to reset command signals. The reset section includes a second time constant circuit responsive to the logic state of the bus for selectively resetting the hysteresis switch to a predetermined logic state. The second time constant circuit is coupled to a second voltage divider and comparator network and when the switching bus is brought substantially to the potential of the common bus for a relatively long period, perhaps one second, the circuit capacitor is permitted to discharge through the circuit resistor to common and upon transcending through the trigger voltage, the voltage across the capacitor causes the system to reset. Other details of the digital interface circuit are set forth in the detailed description and the accompanying drawing.

It is an object of the invention to provide a new and improved noise neutralizing digital interface circuit.

Another object of the invention is to provide a digital interface circuit which may be adapted for use with two wire, low voltage grounded or ungrounded bus communication systems.

Yet another object of the invention is to provide an interface circuit having transmitter means for generating digital output signals to be transmitted to a bus.

Still another object of the invention is to provide a digital interface circuit which provides a first output logic condition when an input signal transcends through a first intermediate voltage in a first direction and a second output logic condition when the input signal transcends through a second intermediate voltage in a second direction, thereby neutralizing low amplitude, spurious electrical signals.

Yet another object of the invention is to provide a digital interface circuit which may be adaptably configured for noise neutralization in accordance with the amplitude and polarity of spurious electrical noise anticipated to be received therein.

Another object of the present invention is to provide a digital interface circuit which may be adapted for automatic reset. These and other objects of the invention will become more apparent from the detailed description thereof taken with the accompanying drawing.

DESCRIPTION OF THE DRAWING

FIG. 5 is a representation of the first and second waveforms appearing at described locations in the interface circuit;

FIG. 6 is a simplified schematic diagram of a process control system incorporating devices within which the digital interface circuit may be used, and;

FIG. 7 is an equation referred to in the specification.

DESCRIPTION OF THE PREFERRED EMBODIMENTS

Figure 1:
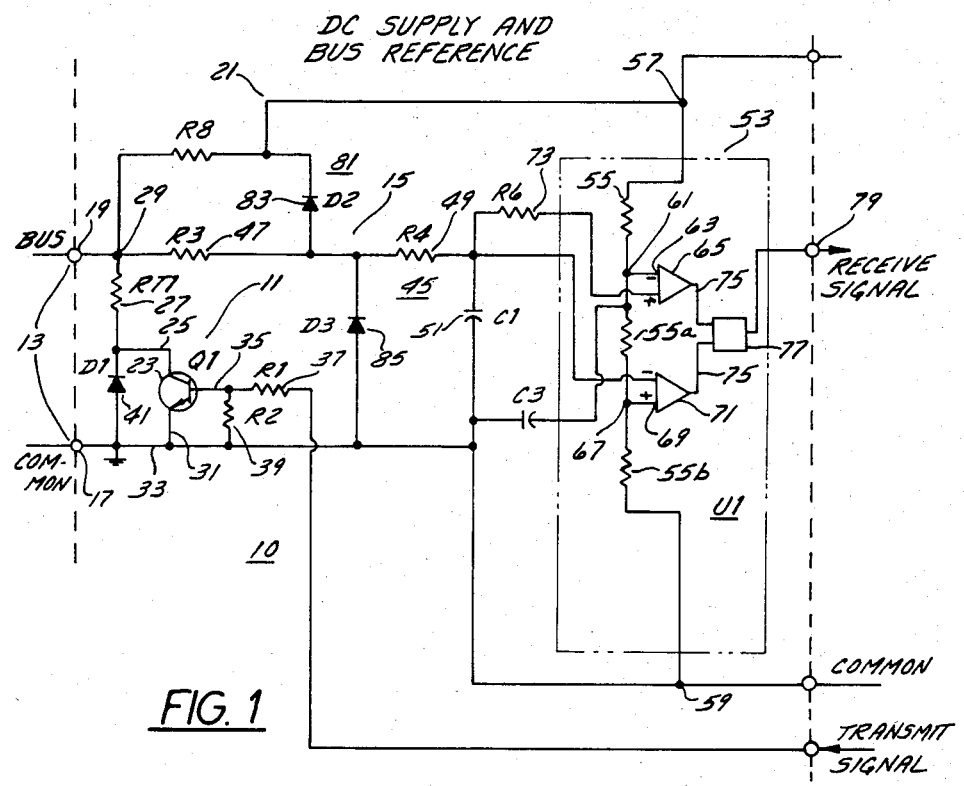
FIG. 1 is a schematic diagram of a first embodiment of the digital interface circuit.

In FIG. 1, the digital interface circuit 10 is shown to include transmitter means 11 adapted to be coupled to a communication bus 13 and receiver means 15 adapted to be coupled to the bus 13 for receiving digital input signals therefrom. The illustrated interface circuit 10 is arranged for communication with a bus 13 of the two wire grounded type and includes a pair of terminals 17, 19 for connection thereto, the terminal 17 being grounded and the terminal 19 being connected through resistors to a source 21 of bus supply or reference voltage. The transmitter means 11 includes a controllable switch 23, preferably a transistor, having its collector 25 connected through a current-limiting resistor 27 to the first, high leg 29 and its emitter 31 to the second, grounded leg 33 of the bus 13. The base 35 of the switch 23 is coupled through a resistor 37 to a device (not shown) such as a microcomputer which is external to the interface circuit and which is capable of selectively changing the switch 23 to a conducting state. When the switch 23 is saturated to a conducting state, the first leg 29 of the bus 13 is placed substantially at the potential of the second leg 33 and the signal thereby transmitted to the bus 13 is a logic "0". Nonconduction of the switch 23, effected by a resistor 39 in the absence of a signal from the external device, will result in the transmission of a logic "1" signal.

While a preferred transistor switch 23 may withstand a voltage across its collector 25 and emitter 31 which has a polarity corresponding to that of the bus supply voltage and yet is several times the magnitude of the latter, the transistor switch 23 may be quickly destroyed by the application of a voltage having a reverse polarity, even one of relatively low magnitude. It is therefore desirable to protect the transistor switch 23 against the application of such a reverse polarity voltage as may result, for example, from a wiring error or from the accidental application of an incorrectly polarized voltage to the bus 13. Accordingly, a diode 41 providing a low impedance path is coupled in parallel with the emitter 31 and collector 25 as shown for protection thereof. Since it is also desirable to limit any current resulting from such a voltage misapplication, a current limiting means 27 is connected in series with the diode. While a fuse may be used for the purpose, nuisance replacement thereof may be avoided by using a resistor of the positive temperature coefficient type as the current limiting means 27. The resulting relatively low fault current may persist indefinitely and upon removal of the fault, the resistor cools, its resistance decreases to a normal, low value and communication may resume.

The receiver means 15 is shown to include first conditioning means 45 which receives digital signals defining a first wave form and directed to it along the first and second legs 29, 33 of the bus 13. The first conditioning means 45 is preferably embodied as a filter network including a pair of serially connected resistors 47, 49 and a capacitor 51 for shaping the first wave form to a second wave form resembling a sawtooth profile. A preferred filter network has a first time constant within the range of one-eighth to one-half of the bit time and a preferred time constant is about one-fourth of the bit time.

The signal represented by the reshaped second wave form is directed to a hysteresis switch 53, preferably a type LM555 integrated circuit chip incorporating a voltage divider and comparator network coupled to a logic flipflop. The voltage divider includes a plurality of resistive elements 55, 55a, 55b serially connected between a point 57 having a potential equal to the bus reference voltage and ground or common point 59, as the case may be. The node 61 common to the first resistor 55 and the second resistor 55a is connected to the first input pin 63 of a first comparator 65 while the node 67 common to the second resistor 55a and the third resistor 55b is connected to the first input pin 69 of the second comparator 71. The second input pins of the first comparator 65 and second comparator 71 respectively are connected to the first conditioning means 45 for sensing the voltage thereat. If the hysteresis switch is embodied as a type LM555 chip rather than, for example, as discrete components, it is desirable to limit the current flow to the second input pin of the first comparator 65 and a resistor 73 is provided for the purpose.

A characteristic of a preferred comparator 65, 71 is that when the voltage sensed at the second input pin exceeds that at the first input pin 63 or 69, respectively, the comparator is caused to switch its logic output state. A switching of logic output state will also occur when the voltage sensed at the first input pin 63 or 69 exceeds that at the second input pin. The output pins 75 of the comparators 65, 71 are coupled to the input pins of a logic flipflop 77, the output pin 79 of which is connected to the "0" or input port of a device, as, for example, a microcomputer for further processing and computing. From the foregoing, it will be appreciated that the output pin 79 of the flipflop 77 will be at logic "0" whenever the output pin 75 of either comparator 65, 71 is at logic "1". Similarly, the output pin 79 of the flipflop 77 will be at logic "1" whenever both of the output pins 75 of the comparators 65, 71 are at logic "0". It should be appreciated that when the receiver means 15 is constructed and arranged as shown, the output pin 79 will be at a logic "0" first output condition when the second wave form input signal transcends through a first intermediate voltage in a first increasing direction. Similarly, it will provide a logic "1" second output condition when the second wave form input signal transcends through a second intermediate voltage in a second decreasing direction.

To describe one of the advantages of the inventive interface circuit 10 and merely by way of illustration rather than of limitation, a bus reference voltage of +5 V. is assumed and the first, second and third resistors 55, 55a, 55b respectively are selected to have equivalent values. The magnitude of the first intermediate voltage will therefore be 3.33 V. while the magnitude of the second intermediate voltage will be 1.66 V. with the difference therebetween being nominally 1.67 V. It is therefore apparent that the noise neutralizing interface circuit 10 will tolerate a persistent, low level electrical noise of a first type having an amplitude at less than 1.67 V., i.e., nominally less than one-third of the value of the bus reference voltage while yet avoiding false output signals.

Additionally, electrical noise of a second type as represented by any precipitous, spurious depression of the voltage of the switched bus 13 for a duration insufficient to represent a valid change of logic state and yet which reaches a voltage value otherwise indicative of such a change will be attenuated by the filtering effect of the first conditioning means 45. This will be true so long as the duration of such a depression is insufficient, as controlled by the time constant of the first conditioning means 45, to cause the second wave form to transcend to a value below that of the second intermediate voltage.

Figure 2:
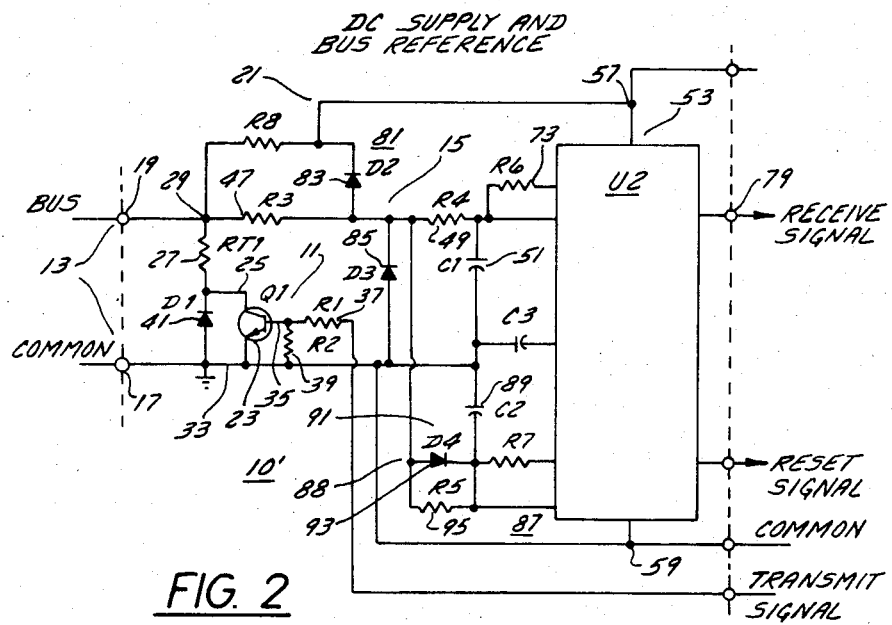
FIG. 2 is a schematic diagram of a second embodiment of the digital interface circuit.

If it is anticipated that noise in the form of spurious voltages may be present on the bus which have a polarity corresponding to that of the reference voltage but in excess thereof or which are of a polarity opposite to that of the reference voltage, it is preferable to provide a clamping network 81 for limiting the magnitude of this second type of spurious noise and for limiting the current resulting therefrom. To that end, a high-speed, computer-type diode 83 is coupled in series with the current limiting resistor 47 for limiting noise of the second type which has a polarity corresponding to that of the reference voltage but is in excess thereof. Such noise will be limited to a maximum value substantially equal to that of the bus reference voltage. Similarly and in the case of spurious noise of the third type having a polarity opposite that of the aforementioned reference voltage, a high-speed, computer-type diode 85 is connected for the purpose as shown in FIGS. 1 and 2.

In those types of process control systems in which a plurality of digitally-controlled devices are coupled to a system controller, it is usually desirable to provide a capability whereby the controller may reset one or a plurality of such devices to a predetermined, known logic state. Such an occasion may arise when, for example, power is initially applied to the system or when one of the devices coupled thereto is reacting in an undesirable manner. Referring to FIG. 2, a second embodiment of the inventive interface circuit 10' is shown to include, in addition to the transmitter means 11 and the receiver means 15 of the first embodiment, reset means 87 coupled to the receiving means 15 and responsive to a command for generating a reset signal. The reset means 87 includes a dual time constant circuit 88 having a capacitor 89 dischargeable at a first rate when the first leg 29 of the bus 13 is at a first logic "0" state and means 91 for charging said capacitor 89 at a second, faster rate when said bus is at a second logic "1" state. The voltage across the capacitor 89 is directed to a second hysteresis switch which is embodied within the envelope identified as U2 in the drawing and which is configured identically to that of the first hysteresis switch 53 of the first embodiment. In a preferred construction, both hysteresis switches may be embodied as a single LM556 integrated circuit, the same being functionally equivalent to a pair of type LM555 integrated circuit chips. Since the output condition of the second flipflop will be governed by the voltage across the capacitor 89, either during discharge thereof as it transcends through a second intermediate voltage in a second direction or during charging thereof as it transcends through a first intermediate voltage in a first direction, it is preferable that the time constant when the capacitor 89 is discharging be selected to be sufficiently long that the false generation of a reset signal during the normal reception of digital signals is avoided. In a preferred embodiment, this reset time constant is selected such that the time required for the capacitor 89 to discharge to a voltage equal to that of the second intermediate voltage be at least four times the maximum anticipated time during which the switched bus 13 will be held at the logic "0" state during the normal transmission and reception of digital signals and a multiple of fourteen times such duration is preferred.

On the other hand, the capacitor 89 should be permitted to charge more rapidly during those times when the first leg 29, the switched bus, is at a logic "1" state. To that end, a high-speed, computer-type diode 93 is coupled in parallel with the resistor 95. In that manner, the recovery time constant of the circuit 88 during those periods when the capacitor 89 is being charged will be controlled by the value of the resistor 47 and the capacitor 89. In one system having a communication rate of 1200 bits per second and a maximum time during which the switched bus 13 is normally held at logic "0" state of 9 bit times, i.e., about 7.5 milliseconds, the component values shown and described will provide a recovery time constant of about 2.2 milliseconds and a reset time constant of about 106 milliseconds. It is to be appreciated, however, that a different communication rate may be selected merely by changing time constants. For example, a communication rate of 600 bits per second may be accommodated by doubling the values of the capacitors 51 and 89.

Figure 3:
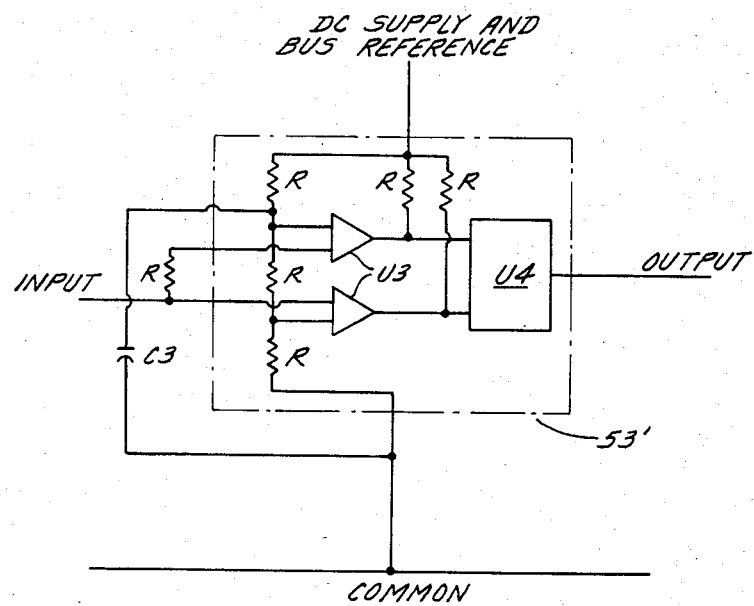
FIG. 3 is a schematic diagram of an exemplary hysteresis switch useful in the interface circuit.
Figure 4:
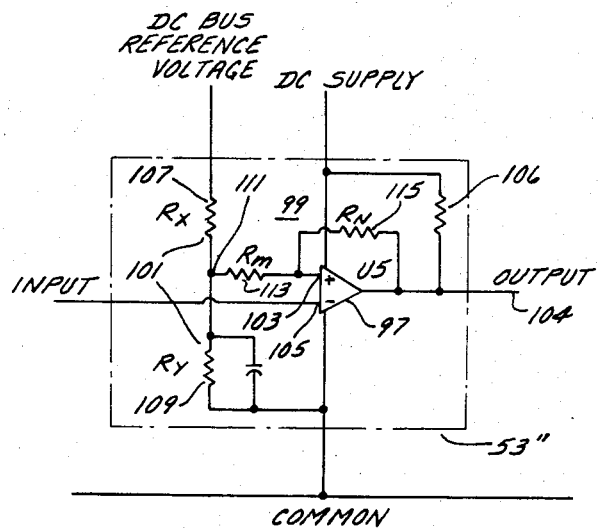
FIG. 4 is a schematic diagram of another exemplary hysteresis switch useful in the interface circuit.

Other configurations of hysteresis switches which may be used in the interface circuit of the present invention are schematically depicted in FIGS. 3 and 4. While the operation of the switch 53' of FIG. 3 will be readily apparent to one of ordinary skill after reviewing the specification, that of FIG. 4 may be of particular interest. There, the switch 53" is shown to include means 97 for comparing voltage signals and a first divider network 99 for selecting the magnitude of the circuit hysteresis. A second divider network 101 provides a first input voltage to a first input pin 103 of the comparator means 97 and cooperates with the first network 99 in a manner such that the magnitude of the first input voltage has a predetermined relationship to the logic state of the comparator means output 104. A pull-up resistor 106 is coupled between the DC supply and the output 104 of the comparator means 97. The comparator means 97 is preferably embodied as an integrated comparator chip while the divider networks 99, 101 are each embodied as a pair of resistors.

With the first leg 29 of the bus 13 coupled to the comparator second input pin 105 and assuming, for example, that the resistors 107 and 109 are selected to be of equivalent value, the voltage V LEG at the first leg 29 when at a logic "0" state will nominally be equal to zero, the voltage V NODE at the node 111 common to the resistors 107, 109 will be one-half the reference voltage V REF and the condition of the output 104 of the comparator, V OUT will be at logic "1" state, nominally equal to the DC supply voltage. Because of the voltage dividing characteristics of the second network 101, the voltage V IN at the first input pin 103 may be expressed by the algebraic equation set forth in FIG. 7. It is apparent, then, that the magnitude of the voltage V IN and therefore the magnitude of the voltages at which the comparator output 104 may be caused to switch its logic state will depend upon the then-existing output logic state.

By way of further exemplary explanation, it will be assumed that the DC supply voltage, the bus reference voltage V REF and the voltage of the bus first leg 29 at logic "1" are +5 VDC, that the resistors 107, 109 are of equivalent value one to the other and that the resistors 113, 115 are of equivalent value one to the other. V NODE will therefore be nominally +2.5 VDC. with V LEG equal to zero, logic state "0", the comparator output voltage will be logic "1" and the voltage V IN will nominally be equal to 3.75 VDC., the first intermediate voltage. As the bus is switched and rises toward the value of V REF in a first direction, the logic state of the comparator output 104 will switch to "0", represented by nominally 0VDC, only when V LEG exceeds V IN, i.e., only when V LEG transcends through the first intermediate voltage in a first direction. When the comparator output 104 switches to logic "0", the voltage V IN is reduced nominally to 1.25 VDC., the second intermediate voltage. Thereafter, when the bus 13 is switched to logic "0" and its voltage V LEG declines toward OVDC, the logic state of the comparator output 104 will switch back to logic "1" only when V LEG is less than V IN, i.e., only when V LEG transcends through the second intermediate voltage in a second direction. In this example, the first and second intermediate voltages will have a hysteresis therebetween of nominally 2.5 VDC. and the interface circuit 10 or 10' will therefore neutralize a persistent, low level noise having an amplitude of less than 2.5 VDC. It will be apparent to those of ordinary skill in the art that with a given reference voltage, the values of the first and second intermediate voltages may be manipulated by the selection of the values of 107, 109, 113 and 115.

In operation and referring to FIG. 5, there is shown in dashed line a typical series of digital signals which may be received at the bus terminals 17, 19 and which define a first wave form 117. The first wave form 117 is characterized by transient phases 119 which define paths substantially parallel to one another. The first conditioning means 45 reshapes the first wave form 117 to a second wave form 121, shown in solid line, which resembles a sawtooth shape. The peak value 123 of the first wave form 117 is substantially equal to the bus reference voltage while the lowest value 125 of the first wave form 117 is substantially equal to the voltage of the grounded or common bus, as the case may be. Superimposed upon the curves are horizontal axes 127, 129 respectively defining the level of the first intermediate voltage and the second intermediate voltage. While the levels of these voltages as represented by the axes 127, 129 may be selected in a variety of ratios with respect to the reference voltage and as described above, it is convenient to take advantage of the characteristics of the aforementioned integrated chips, in which cases the values of the first intermediate voltage and the second intermediate voltage will be two-thirds and one-third, respectively, of the value of the bus reference voltage. As the second wave form 121 transcends through the first intermediate voltage in a first direction as represented by the points 131, the output of the hysteresis switch 53 will be caused to be in a first output condition. As the second wave form 121 transcends through the second intermediate voltage in a second direction as represented by the points 133, the output of the hysteresis switch 53 will be caused to change to a second output condition. When the voltage of the second wave form 121 is less than the second intermediate voltage but greater than the first intermediate voltage, the output condition of the hysteresis switch 53 will remain in the immediately preceding condition, either logic "1" or logic "0". It is therefore apparent that the voltage of any spurious noise which accompanies the signal voltage will not cause a change in the output condition of the hysteresis switch 53 so long as the peak amplitude of the spurious voltage is less than the difference between the first intermediate voltage and the second intermediate voltage.

The following components types and values have been found useful in the preferred embodiments used with a bus reference voltage of +5 V. and a communication rate of 1200 bits per second. Resistance is in ohms, one-quarter watt unless otherwise specified and with the exception of RT1'; capacitance is in microfarads; tolerances are 10% except the tolerance of RT1 is 30%.

| FIGS. 1 and 2 | | | |
|---|---|---|---|
| RT1 | 10 at 25° C. | R1 | 6.8K |
| R3 | 10K | R2 | 20K |
| R5–R7 | 470K | R4 | 47K |
| C2 | 0.22 | C1 | 0.0033 |
| D1 | 1N5060 | C3 | 0.01 |
| Q1 | GES5822 | D2–D4 | 1N4148 |
| U2 | LM556 | U1 | LM555 |
| R8 | 47K (receiving device) 470 (controller) | | |
| FIG. 3 | | | |
| U3 | Dual comparator | U4 | Flipflop of CMOS, TTL, D, J-K or R-S types |
| FIG. 4 | | | |
| U5 | Comparator | | |

With reference to FIG. 6, there is shown a typical process control system 135 as may be used in an HVAC application. The system 135 includes a digital electronic master controller 137 and a plurality of slave control devices 139 coupled thereto by a communication bus 13. The devices 139 may include actuators for controllably positioning liquid flow control valves and dampers and sequencers for controllably positioning switches. Positioning of valves and dampers is by digital signals transmitted from the controller 137 along the bus 13 while signals representing actual damper and valve positions may be transmitted from the devices 139 to the controller 137. The first embodiment of the interface circuit 10 would normally be used in conjunction with the controller 137 while that of the second embodiment which incorporates reset means 87 would be used in slave devices 139 which are bus-linked to the the controller 137.

While only a few embodiments of the inventive interface circuit 10 have been shown and described, it is not intended to be limited thereby but only by the scope of the appended claims.

I claim:

1. An interface circuit for facilitating the reception of bus-transmitted digital signals in the presence of electrical noise, said circuit including:
   transmitter means adapted to be coupled to a communication bus and having controllable switch means for generating digital output signals to be transmitted to said bus;
   receiving means adapted to be coupled to said communication bus for receiving digital input signals defining a first wave form and transitory between a first voltage and a second voltage;
   said receiving means including first conditioning means for shaping said first wave form to a second wave form;
   means for detecting said second wave form and providing a first output condition at an output terminal when said second wave form transcends through a first intermediate voltage between said first and second voltage in a first transition direction and for providing a second output condition at said output terminal when said second wave form transcends through a second intermediate voltage between said first and second voltage in a second transition direction, said interface circuit thereby neutralizing spurious electrical signals of a first type having a maximum amplitude less than the voltage difference between said intermediate voltages.

2. The invention set forth in claim 1 wherein said digital signals are in accordance with a predetermined signal bit time and said second wave form is displaced with respect to said first wave form by a first time constant substantially less than said bit time.

3. The invention set forth in claim 2 wherein said time constant is between one-eighth and one-half of said bit time.

4. The invention set forth in claim 3 wherein said receiving means further includes second conditioning means coupled to said first conditioning means for attenuating spurious electrical noise of a second type having a maximum amplitude substantially greater than said second voltage and a maximum duration less than one-eighth of said bit time.

5. The invention set forth in claim 4 wherein said first conditioning means includes first resistor means and capacitor means for determining said time constant and said second conditioning means includes high speed unidirectionally conducting means and current limiting resistor means, said current limiting resistor means coacting with said first conditioning means for providing a second time constant.

6. A digital interface circuit including:

transmitter means adapted to be coupled to a communication bus and including controllable switching means for generating digital output signals to be transmitted to said bus;

receiving means adapted to be coupled to said communication bus for receiving digital input signals defining a first wave form transitory between a first voltage and a second voltage, said receiving means including a resistive-capacitive filter network for conditioning said first wave form to a second wave form;

a hysteresis switch coupled to said receiving means for providing a first output condition at an output terminal when said second wave form transcends through a first intermediate voltage between said first and second voltage in a first direction and for providing a second output condition at said output terminal when said second wave form transcends through a second intermediate voltage between said first and second voltage in a second direction, and;

means coupled to said receiving means and responsive to a command signal for resetting said receiving means and said hysteresis switch to a predetermined one of said output conditions.

* * * * *

UNITED STATES PATENT OFFICE
CERTIFICATE OF CORRECTION

PATENT NO. : 4,504,959
DATED : March 12, 1985
INVENTOR(S) : Terry A. Heckenbach

It is certified that error appears in the above-identified patent and that said Letters Patent are hereby corrected as shown below:

Column 3, line 48 "" should be --"l"--

Column 9, line 61 "components" should be --component--

Signed and Sealed this

Sixth Day of August 1985

[SEAL]

Attest:

DONALD J. QUIGG

Attesting Officer      Acting Commissioner of Patents and Trademarks